US010268483B2

(12) United States Patent
Remis et al.

(10) Patent No.: US 10,268,483 B2
(45) Date of Patent: Apr. 23, 2019

(54) DATA PROTOCOL FOR MANAGING PERIPHERAL DEVICES

(71) Applicant: LENOVO Enterprise Solutions (Singapore) PTE. LTD., New Tech Park (SG)

(72) Inventors: Luke Remis, Raleigh, NC (US); Mark E. Andresen, Cary, NC (US); Wilson Velez, Raleigh, NC (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 143 days.

(21) Appl. No.: 15/277,844

(22) Filed: Sep. 27, 2016

(65) Prior Publication Data
US 2018/0088958 A1  Mar. 29, 2018

(51) Int. Cl.
G06F 13/00 (2006.01)
G06F 9/4401 (2018.01)
G06F 13/42 (2006.01)

(52) U.S. Cl.
CPC .......... G06F 9/4401 (2013.01); G06F 9/4411 (2013.01); G06F 13/4282 (2013.01); *G06F 2213/0026* (2013.01)

(58) Field of Classification Search
CPC ............... G06F 9/4401; G06F 13/4282; G06F 2213/0026
See application file for complete search history.

(56) References Cited

U.S. PATENT DOCUMENTS

| 5,523,747 A * | 6/1996 | Wise | H04N 21/2383 340/10.1 |
| 6,615,297 B1 * | 9/2003 | Beard | G06F 3/1204 382/276 |
| 7,330,834 B1 * | 2/2008 | LaPierre | G06Q 40/00 705/35 |
| 9,026,687 B1 * | 5/2015 | Govande | G06F 13/10 710/10 |
| 2002/0052994 A1 * | 5/2002 | Khan | G06F 13/4068 710/300 |
| 2006/0031151 A1 * | 2/2006 | Dorr | G06Q 30/00 705/37 |
| 2006/0047852 A1 * | 3/2006 | Shah | G06F 9/4405 709/245 |

(Continued)

*Primary Examiner* — Jing-Yih Shyu
(74) *Attorney, Agent, or Firm* — Kunzler, PC; Bruce R. Needham

(57) ABSTRACT

An apparatus, system, method, and program product for managing peripheral devices using a data protocol is presented. A connection module determines one or more communication bus cables that communicatively couple one or more peripheral devices to an information handling device. A data module reads a data packet associated with a peripheral device over each of the one or more communication bus cables. Each data packet includes an identifier for a location where the peripheral device is installed. A topology module determines a cable connection configuration for the one or more communication bus cables and the one or more peripheral devices based on the installation location identifier received from each of the data packets associated with the one or more peripheral devices.

15 Claims, 7 Drawing Sheets

(56) References Cited

U.S. PATENT DOCUMENTS

| | | | |
|---|---|---|---|
| 2007/0118674 A1* | 5/2007 | Ulenas | G06F 13/387 |
| | | | 710/305 |
| 2014/0325096 A1* | 10/2014 | Jung | G06F 13/126 |
| | | | 710/16 |
| 2015/0113106 A1* | 4/2015 | Consul | H04L 41/32 |
| | | | 709/221 |
| 2015/0331894 A1* | 11/2015 | Barron | G06F 17/30864 |
| | | | 707/622 |
| 2017/0293545 A1* | 10/2017 | Brooks | G06F 11/3051 |
| 2017/0337140 A1* | 11/2017 | Ragupathi | G06F 12/1408 |
| 2017/0344259 A1* | 11/2017 | Freyensee | G06F 3/061 |
| 2017/0344511 A1* | 11/2017 | Chou | G06F 13/4282 |
| 2018/0081849 A1* | 3/2018 | Remis | G06F 13/4282 |

* cited by examiner

DATA PROTOCOL FOR MANAGING PERIPHERAL DEVICES

FIELD

The subject matter disclosed herein relates to peripheral computing devices and more particularly relates to a data protocol for managing peripheral devices.

BACKGROUND

Computing devices may include peripheral devices that are coupled to the computing device using one or more communication buses. The communication buses may be communication bus cables that communicatively couple peripheral devices to an information handling device. Conventional communication bus architectures and protocols may not be capable of managing multiple peripheral devices that are coupled to an information handling device using communication bus cables.

BRIEF SUMMARY

An apparatus for managing peripheral devices is disclosed. A method and computer program product also perform the functions of the apparatus. The apparatus includes a connection module that determines one or more communication bus cables that communicatively couple one or more peripheral devices to an information handling device. The apparatus also includes a data module that reads a data packet associated with a peripheral device over each of the one or more communication bus cables. Each data packet includes an identifier for a location where the peripheral device is installed.

The apparatus further includes a topology module that determines a cable connection configuration for the one or more communication bus cables and the one or more peripheral devices based on the installation location identifier received from each of the data packets associated with the one or more peripheral devices. In one embodiment, the topology module provides the cable connection configuration of the communication bus cables and the peripheral devices to a basic input/output system ("BIOS").

In a further embodiment, the apparatus includes a notification module that sends a notification in response to the determined cable connection configuration not matching a predefined cable connection configuration. In some embodiments, each of the one or more peripheral devices is installed in a drive bay of a backplane, and the identifier includes a bay identifier and an associated slot identifier of the drive bay. In various embodiments, the data packet includes a plurality of fields that define the identifier. The plurality of fields may include a field for the bay identifier and a field for the slot identifier.

In one embodiment, the data packet further includes one or more fields that include data describing one or more characteristics of a storage enclosure processor ("SEP") of a backplane. In various embodiments, the apparatus includes an adjustment module that dynamically modifies one or more performance characteristics of a field programmable gate array ("FPGA") based on the one or more characteristics of the SEP. The FPGA may be communicatively coupled to the SEP and one or more peripheral devices of the backplane using a communication bus cable.

In some embodiments, the one or more characteristics for the SEP includes a flag indicating whether the SEP supports data parity, a maximum clock speed for the SEP, a time-out parameter for polling the SEP, and/or a maximum number of peripheral devices supported by the SEP. In certain embodiments, the apparatus includes a verification module that checks an integrity of data included in one or more fields of the data packet using a checksum, which may be included in a checksum field of the data packet.

In some embodiments, the apparatus includes a translate module that receives a virtual pin port ("VPP") command from a VPP enabled processor. The VPP command may be intended for a peripheral device that is identified by the install location identifier on a backplane. The translate module, in a further embodiment, writes the VPP command to a corresponding field in the data packet and sends the data packet that includes the VPP command to a storage enclosure processor ("SEP") on the backplane using a communication bus cable coupled to the SEP and associated with the intended peripheral device.

In some embodiments, the translate module writes a parity value to a parity field of the data packet, which may be used by the SEP to verify the integrity of data written to the data packet. In a further embodiment, the VPP command includes one or more of a peripheral device enable command, a peripheral device disable command, and/or a peripheral device activity indicator toggle command. In some embodiments, the communication bus cable includes a peripheral component interconnect express ("PCIe") cable. In various embodiments, the peripheral device includes a non-volatile memory express ("NVMe") storage device.

A method includes determining one or more communication bus cables that communicatively couple one or more peripheral devices to an information handling device. The method further includes reading a data packet associated with a peripheral device over each of the one or more communication bus cables. Each data packet includes an identifier for a location where the peripheral device is installed. The method also includes determining a cable connection configuration for the one or more communication bus cables and the one or more peripheral devices based on the installation location identifier received from each of the data packets associated with the one or more peripheral devices.

The method, in one embodiment, includes providing the cable connection configuration of the communication bus cables and the peripheral devices to a basic input/output system ("BIOS") and sending a notification in response to the determined cable connection configuration not matching a predefined cable connection configuration.

In one embodiment, each of the one or more peripheral devices is installed in a drive bay of a backplane, the identifier includes a bay identifier and an associated slot identifier of the drive bay, and the data packet includes a plurality of fields defining the identifier. The plurality of fields may include a field for the bay identifier and a field for the slot identifier.

In certain embodiments, the method includes dynamically modifying one or more performance characteristics of a field programmable gate array ("FPGA") based on one or more characteristics of a storage enclosure processor ("SEP") of a backplane. The FPGA may be communicatively coupled to the SEP and one or more peripheral devices of the backplane using a communication bus cable. The data packet may further include one or more fields that include data describing the one or more characteristics of the SEP.

In some embodiments, the method further includes receiving a virtual pin port ("VPP") command from a VPP enabled processor. The VPP command may be intended for a peripheral device identified by the install location identifier on a backplane. The method may also include writing the VPP command to a corresponding field in the data packet and sending the data packet that includes the VPP command to a storage enclosure processor ("SEP") on the backplane using a communication bus cable coupled to the SEP and associated with the intended peripheral device.

A program product includes a computer readable storage medium that stores code executable by a processor. The executable code includes code to perform determining one or more communication bus cables that communicatively couple one or more peripheral devices to an information handling device. The executable code includes code to perform reading a data packet associated with a peripheral device over each of the one or more communication bus cables. Each data packet includes an identifier for a location where the peripheral device is installed. The executable code includes code to perform determining a cable connection configuration for the one or more communication bus cables and the one or more peripheral devices based on the installation location identifier received from each of the data packets associated with the one or more peripheral devices.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
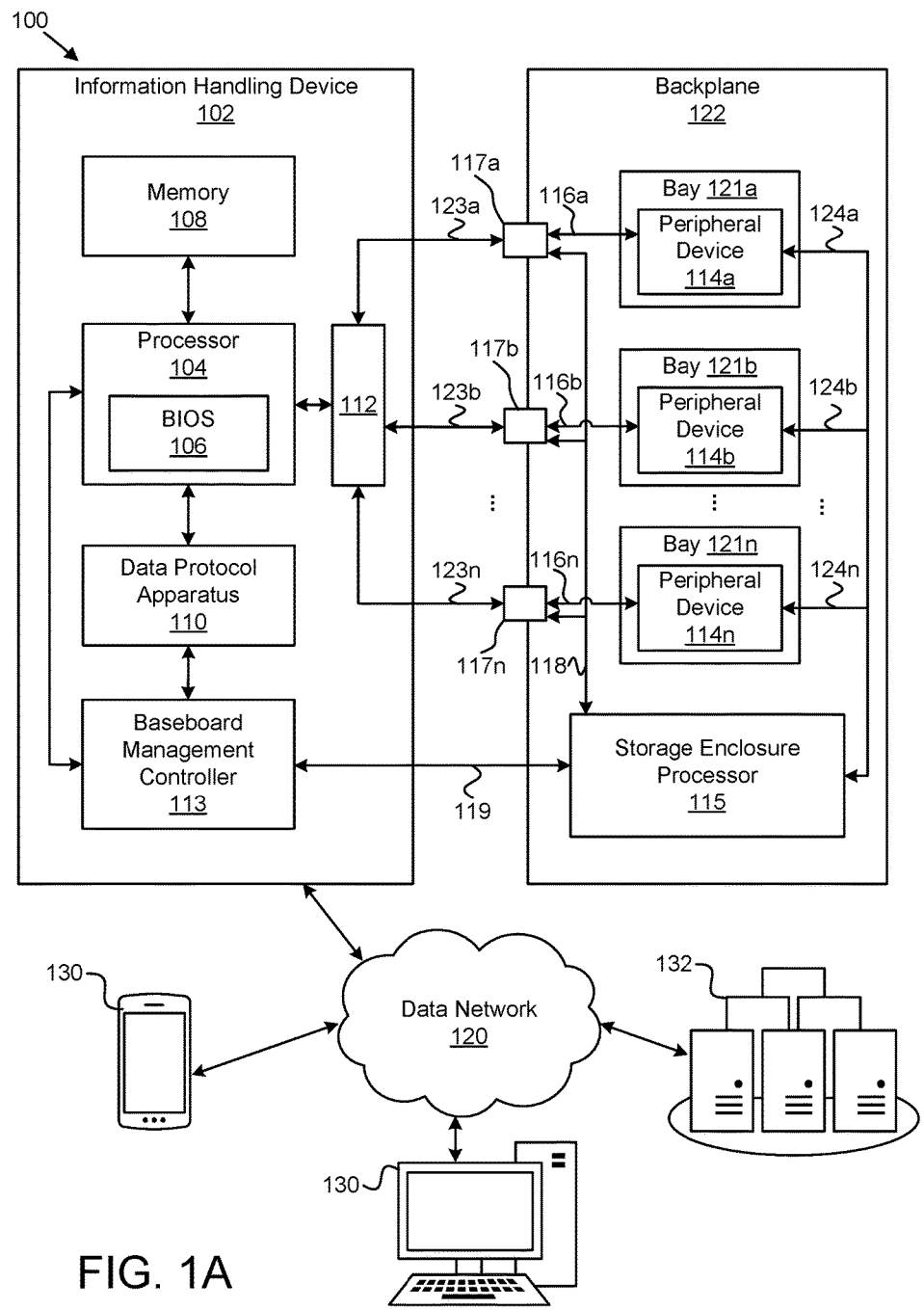
FIG. 1A is a schematic block diagram illustrating one embodiment of a system for managing peripheral devices using a data protocol.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A depicts one embodiment of a system 100 for managing peripheral devices using a data protocol. In one embodiment, the system 100 includes an information handling device 102. The information handling device 102 may include a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a personal digital assistant, or another computing device that includes a processor 104, a volatile memory 108, and/or a non-volatile storage medium, which may be embodied as at least one of the peripheral devices 114*a-n*.

The processor 104 may include one or more central processing units ("CPUs"), one or more processor cores, a field programmable gate array ("FPGA") or other programmable logic, an application specific integrated circuit ("ASIC"), a controller, a microcontroller, and/or another semiconductor integrated circuit device. The processor 104 may include firmware used to perform hardware initialization during the booting process, such as an instance of a basic input/output system ("BIOS") 106. The BIOS 106, in one embodiment, may include an instance of the Unified Extensible Firmware Interface ("UEFI") firmware.

The system 100, in certain embodiments, includes one or more peripheral devices 114a-n (collectively 114). The peripheral devices 114, as used herein, may include internal and/or external devices that provide input and/or output for the information handling device 102. For example, the peripheral devices 114 may be embodied as storage devices (e.g., non-volatile memory ("NVM") devices, NVM express ("NVMe") devices, solid state storage devices ("SSSD"), and/or the like), flash memory devices, network cards, graphics cards, and/or the like.

In one embodiment, the peripheral devices 114 are connected to the information handling device 102 via a backplane 122. As used herein, a backplane 122 may be embodied as a printed circuit board ("PCB") that includes several slots 117a-n (collectively 117), ports, and/or the like, for connecting multiple peripheral devices 114 or other circuit boards to the backplane 122. For example, the backplane 122 may include a plurality of slots 117, cable connections (e.g., data bus 116 and/or management bus 118 cable connections), and/or other types of connectors for connecting NVMe storage devices to the information handling device 102. As depicted in FIG. 1A, the backplane 122 may be enclosed in a separate device or enclosure, such as a separate storage enclosure, e.g., a storage rack, that is coupled to the information handling device 102 using one or more communication bus cables 123a-n (collectively 123). In some embodiments, the backplane 122 is enclosed within the information handling device 102.

As used herein, a slot 117 on the backplane 122 may be an access point, port, slot, or the like for connecting a communication bus cable 123 from the information handling device 102. The slot 117 may be configured for various types of communication bus cables 123, such as PCIe communication bus cables 123. The slots 117 may be identified, accessed, referenced, or the like using a slot identifier. The slot identifier may be globally unique to a slot 117, unique to a slot 117 on a backplane 122 basis, or the like. The slot identifier may be used, at least in part, to access a peripheral device 114 communicatively connected to the communication bus cable 123 connected to the slot 117.

In some embodiments, the backplane 122 includes drive bays 121a-n (collectively 121) where peripheral devices 114 can be installed, fixed, mounted, and/or the like. For example, a drive bay 121 may be configured for mounting an NVMe storage device to the backplane 122. In some embodiments, each bay 121 is identified with an identifier that may be unique to the backplane 122, globally unique, and/or the like. If the bay identifier is unique to the backplane 122 then, in one embodiment, to access a peripheral device 114 installed in a bay 121, a backplane 122 identifier may also be needed to ensure that the correct peripheral device 114 on the correct backplane 122 is being accessed. In some embodiments, the slot identifier and the bay identifier are used to access a peripheral device 114 that is installed in the bay 121 identified by the bay identifier, and communicatively coupled to the communication bus cable 123 connected to the slot 117 identified by the slot identifier.

In certain embodiments, the peripheral devices 114 are communicatively coupled to the processor 104 using one or more communication bus cables 123. The communication bus cables 123 may include a data bus cable that corresponds to a data bus 116a-n (collectively 116) on the backplane 122, which may be embodied as a cable, as a data line of a PCB of the backplane 122, and/or the like. The data bus cable and the corresponding data bus 116 on the backplane 122 may be used to perform input/output ("I/O") operations (e.g., transmitting data) between the processor 104 and the peripheral devices 114. In certain embodiments, the data bus cable and/or the data bus 116 is a peripheral component interconnect ("PCI") bus, a PCI extended ("PCI-X") bus, an accelerated graphics port ("AGP") bus, a PCI express ("PCIe") bus, a universal serial bus ("USB"), a serial advanced technology attachment ("SATA") bus, and/or the like.

In some embodiments, each peripheral device 114 is coupled to the processor 104 using a separate data bus cable and/or data bus 116. For example, there may be a 1:1 relationship between the peripheral devices 114 and the data bus cables and/or data buses 116 such that each peripheral device 114 is coupled to the information handling device 102 using a separate and independent data bus cable and/or data bus 116.

In one embodiment, the communication bus cable 123 includes a management bus cable that corresponds to a management bus 118 on the backplane 122, which may be embodied as a cable, as a data line of a PCB of the backplane 122, and/or the like. In one embodiment, a management bus 118 is configured to transmit management messages to/from the processor 104 from/to the peripheral devices 114 via a management bus cable. A management bus 118 may be embodied as an Inter-Integrated Circuit ("I$^2$C") communication bus. Management messages may include messages that control a state of the peripheral device 114, such as power on/power off, disable/enable, standby, reset, and/or the like. For example, an operating system running on the information handling device 102 may send a management message over a management bus cable and a management bus 118 to reset a storage device attached to the information handling device 102 over a PCIe cable.

In some embodiments, each management bus cable and/or management bus 118 is communicatively coupled to a single corresponding peripheral device 114. In such an embodiment, there may be a 1:1 relationship between management bus cables and/or management buses 118 and peripheral devices 114 such that each peripheral device 114 is coupled to the information handling device 102 using a separate and independent management bus cable. Referring to FIG. 1A, each management bus connection 124a-n (collectively 124) for the peripheral devices 114 may be associated with a separate and distinct management bus 118 that corresponds to a separate management bus cable. For example, each peripheral device 114 may be coupled to a corresponding management bus cable, instead of using a single management bus cable to manage multiple peripheral devices 114.

In another embodiment, there may be a 1:n or one-to-many relationship between a management bus cable, a management bus 118, and a plurality of peripheral devices 114. In such an embodiment, a management bus 118 may include a plurality of management bus connections 124 that are each connectable to a peripheral device 114 and addressable using an identifier, a unique address (e.g., an address for the management bus connection 124, an address for a peripheral device 114, or the like), and/or the like.

A management bus 118, in one embodiment, is connected to a storage enclosure processor ("SEP") 115 for the backplane 122. As used herein, a SEP 115 may be a processor located on the backplane 122 for managing peripheral devices 114 on the backplane 122. For instance, the SEP 115 may manage the management bus connections 124 for the management bus 118 to transmit management messages between the information handling device 102 and the peripheral devices 114 on the backplane 122, using a management bus cable, based on a unique address for the management bus connection 124 and/or the peripheral device 114.

For example, an operating system for the information handling device 102 may send a reset command to a peripheral device 114 by providing an identifier or address for the peripheral device 114 and/or the management bus connection 124 of the management bus 118. In such an example, the SEP 115 may use the provided identifier or address to send the reset command to the peripheral device 114 associated with the identifier or address. In a further example, the SEP 115 may translate, map, or otherwise cross-reference the provided identifier or address to a different identifier or address used to communicate with the peripheral device 114 on the backplane 122.

As used herein, a management connection between the processor 104, data protocol apparatus 110, or the like and a peripheral device 114 is known as a management bus connection 124 whether there is a single management bus cable and/or management bus 118 connected to each peripheral device 114 (e.g., one management bus connection 124 per management bus cable/management bus 118) or a single management bus cable and/or management bus 118 connected to multiple peripheral devices 114 (e.g., multiple addressable management bus connections 124 per management bus cable/management bus 118).

The baseboard management controller ("BMC") 113, in one embodiment, is a specialized hardware component of the information handling device 102 that is used to manage the interface between system management software, such as the BIOS 106, an operating system, or other management software, and platform hardware such as the peripheral devices 114 using a system management bus 119. For example, the BMC 113 may manage the transmission of management messages between the processor, the BIOS 106, the data protocol apparatus 110, an operating system, and/or the like, and the peripheral devices 114, the SEP 115, and/or the like.

The bridge or switch 112, in one embodiment, connects the peripheral devices 114 to the processor 104 and/or the data protocol apparatus 110 via the communication bus cables 123. The bridge 112 may act as a switch and may direct data and/or management commands between the processor 104 and the respective peripheral devices 114 using the communication bus cables 123 (e.g., a data bus cable, a management bus cable, or a data bus/management bus combination cable). In certain embodiments, a plurality of bridges 112 may be located in the information handling device 102, with each bridge 112 connected to one or more peripheral devices 114 of one or more backplanes 122.

The data protocol apparatus 110, in one embodiment, is configured to determine one or more characteristics associated with a peripheral device 114, a backplane 122, a SEP 15, and/or the like by reading a predefined data packet that includes one or more fields for the various characteristics. The data protocol apparatus 110 is configured to determine one or more communication bus cables 123 that communicatively coupled one or more peripheral devices 114 to an information handling device 102, read a data packet associated with a peripheral device 114 over a communication bus cable 123, and determine a cable connection configuration for the one or more communication bus cables 123 and the one or more peripheral devices 114 based on the characteristics included in the data packet read over the communication bus cable 123. In some embodiments, at least a portion of the data protocol apparatus 110 is located on the processor 104, on the backplane 122, on the BMC 113, on the SEP 115, and/or the like. The data protocol apparatus 110 will be described in more detail below with reference to FIGS. 2 and 3.

In one embodiment, the information handling device 102 is connected to a data network 120. The data network 120, in one embodiment, includes a digital communication network that transmits digital communications. The data network 120 may include a wireless network, such as a wireless cellular network, a local wireless network, such as a Wi-Fi network, a Bluetooth® network, a near-field communication ("NFC") network, an ad hoc network, and/or the like. The data network 120 may include a wide area network ("WAN"), a storage area network ("SAN"), a local area network ("LAN"), an optical fiber network, the internet, or other digital communication network. The data network 120 may include two or more networks. The data network 120 may include one or more servers, routers, switches, and/or other networking equipment. The data network 120 may also include one or more computer readable storage media, such as a hard disk drive, an optical drive, non-volatile memory, RAM, or the like.

In one embodiment, the information handling device 102 is connected to one or more other computing devices 130/132 via the data network 120. The other computing devices 130, for example, may include smart phones, tablet computers, laptops, and/or the like. In a further embodiment, the other computing devices 132 may include servers, other devices in a data center located on a local or external data network 120, and/or the like.

Figure 1B:
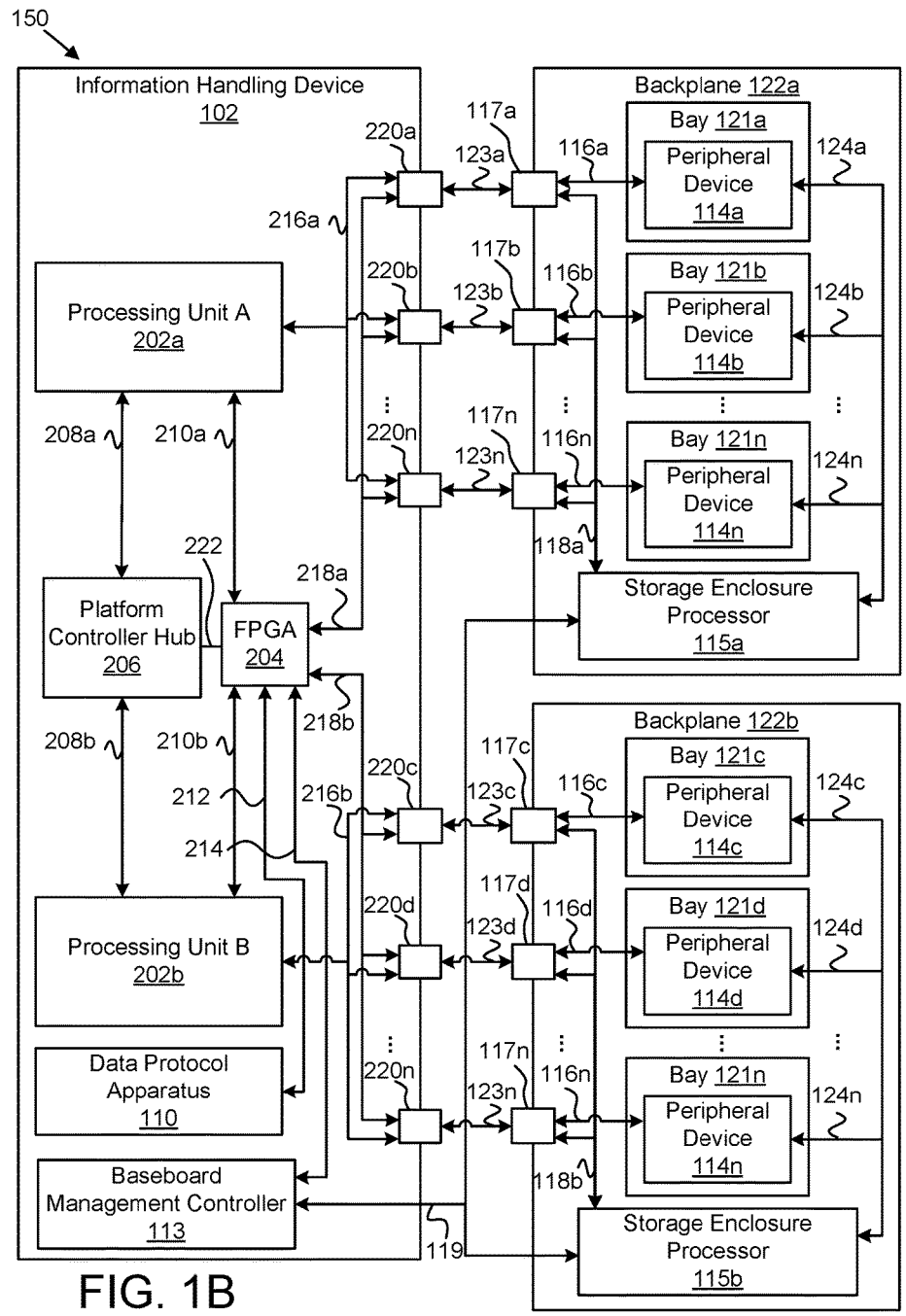
FIG. 1B is a schematic block diagram illustrating one embodiment of another system for managing peripheral devices using a data protocol.

FIG. 1B depicts one embodiment of a "direct attached" system 150 for managing peripheral devices using a data protocol. In one embodiment, the system 150 includes elements that are substantially similar to like elements depicted and described above with reference to FIG. 1A. The system 150 of FIG. 1B, in one embodiment, includes two separate processing units 202a-b (collectively 202) that are each communicatively coupled to peripheral devices 114 on respective backplanes 122a-b (collectively 122). Each processing unit 202 may include one or more processors 104, processor cores, and/or the like, memory elements, storage elements (e.g., registers), and/or the like.

Each processing unit 202 may be communicatively coupled to the peripheral devices 114 on each respective backplane 122 using a communication bus cable 123, described above, and one or more data buses 216a-b (collectively 216) on the information handling device 102, e.g., on the motherboard or other PCB of the information handling device 102, and one or more data buses 116 on the backplanes 122. A processing unit 202 may send various commands, data, instructions, and/or the like to the peripheral devices 114 using the communication buses 123 and/or the data buses 216, 116. For example, a processing unit 202 may send a read request command, a write request command, or the like to an NVMe peripheral storage device located at slot ID 10 and bay ID 62 on the backplane 122.

In a further embodiment, each processing unit 202 is communicatively coupled to a field programmable gate array ("FPGA") 204, or other logic device such as an application-specific integrated circuit ("ASIC"), or the like. In one embodiment, a processing unit 202 is communicatively coupled to the FPGA 204 using an I2C communication bus, a super high power ("SHP") management bus, and/or some other serial communication bus 210a-b. The FPGA 204 may be communicatively coupled to a backplane 122, and more particularly a SEP 115 and/or a peripheral device 114 located on a backplane 122, using one or more communication bus cables 123 and/or one or more management buses 218a-b (collectively 218) located on the information handling device 102 and one or more management buses 118 located on the backplanes 122.

The FPGA 204, as used herein, may communicate, transmit, send/receive, and/or the like data, information, commands, etc., between the processing units 202 and/or the data protocol apparatus 110 on the information handling device 102, and the SEP 115 and/or the peripheral devices 114 on the backplane 122. For example, the FPGA 204 may communicate with the SEP 115 on a backplane 122, using a particular communication bus cable 123, to read a data packet that includes a slot ID and a bay ID for the peripheral device 114 coupled to the communication bus cable 123. In such an embodiment, the FPGA 204 may be configured as a bus master, and each SEP 115 on each backplane 122 may be configured as bus slaves. In such a master/slave configuration, the FPGA 204 acting as the bus master, directs commands, data packets, information, or the like over the communication bus cables 123 to the SEPs 115 acting as bus slaves and intended for one or more peripheral devices 114. The FPGA 204 may also request or read data packets from the SEPs 115 over various communication bus cables 123. In such an embodiment, each peripheral device 114 may be configured as a slave device.

The FPGA 204 may track, store, collect, and/or the like the slot ID and bay ID information associated with each communication bus cable 123 and peripheral device 114 coupled to the communication bus cable 123. In such an embodiment, the FPGA 204 may provide, send, or otherwise make available the slot ID and bay ID information for each peripheral device 114, including the communication bus cables 123 coupled to each peripheral device 114, to an operating system for the information handling device 102, to the BIOS 106, and/or the like. In certain embodiments, the management buses 118, 218 coupled to the FPGA 204 and the SEP 115 include SHP management buses.

In certain embodiments, the information handling device 102, or the motherboard of the information handling device 102, includes one or more slots 220a-n (collectively 220) that are configured to receive a communication bus cable 123 coupled to a corresponding slot 117 on the backplane 122. The slot 220 may be identified using a slot ID, a PCIe lane identifier, and/or the like.

In one embodiment, each processing unit 202 is communicatively coupled to a platform controller hub ("PCH") 206 (over a communication bus 208a-b) that is configured to control data paths, like the data buses 216, and manage various functions offloaded from the processing units 202 such as clocking. In some embodiments, the processing units 202 use the PCH 206 to send various data and management commands to the peripheral devices 114 via the FPGA 204. In such an embodiment, the PCH 206 may be coupled to the FPGA 204 using a communication bus 222, which may be embodied as an enhanced serial peripheral interface ("eSPI") bus.

In some embodiments, the data protocol apparatus 110 is also coupled to the FPGA 204, over a communication bus 212, to perform the various functions of the data protocol apparatus 110 as described in more detail below. Furthermore, the BMC 113 may also be coupled to the FPGA 204, over a communication bus 214, to manage the interface between system management software, such as the BIOS 106, an operating system, or other management software, and the peripheral devices 114, the SEP 115, or the like.

Figure 1C:
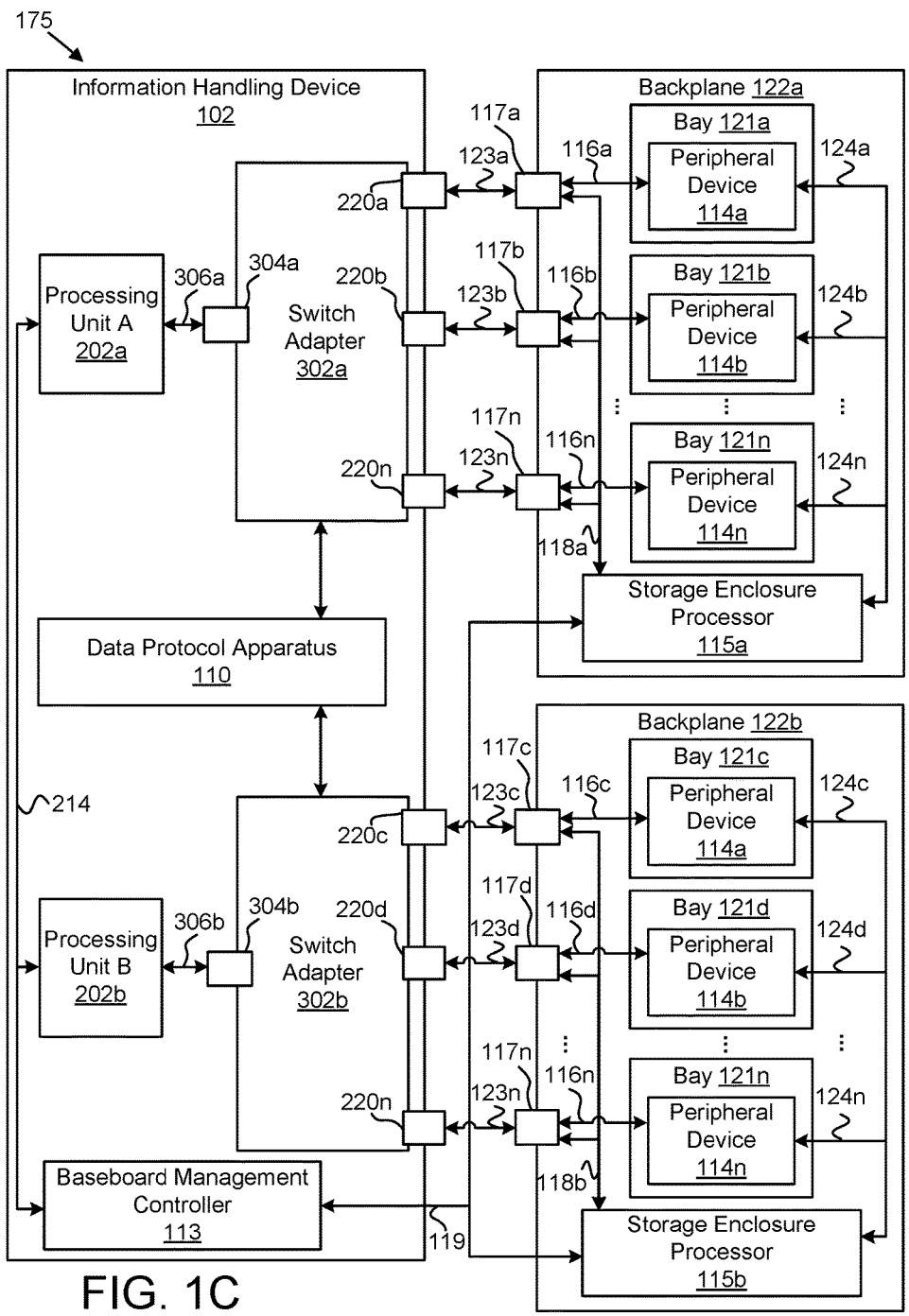
FIG. 1C is a schematic block diagram illustrating one embodiment of another system for managing peripheral devices using a data protocol.

FIG. 1C depicts one embodiment of a "switched" system 175 for managing peripheral devices using a data protocol. In one embodiment, the system 175 includes elements that are substantially similar to like elements depicted and described above with reference to FIGS. 1A and 1B. In one embodiment, the system 175 includes a plurality of switch adapters 302a-b (collectively 302), which may be substantially similar to the switch 112 described above with reference to FIG. 1A.

Each switch adapter 302 may be configured to manage and transmit between each processing unit 202, the data protocol apparatus 110, the BMC 113, or the like, and each peripheral device 114 of a backplane 122. For example, a processing unit 202 may provide data or management commands for a particular peripheral device 114 to a coupled switch adapter 302 via a communication bus 306a-b coupled to a communication bus port 304a-b of the switch adapter 302. The switch adapter 302 may forward or transmit the command to a particular peripheral device 114. The peripheral device 114 may be identified using a unique address, a slot ID, a bay ID, and/or the like. Based on the identifier, the switch adapter 302 may determine which communication bus cable 123 is coupled to the identified peripheral device 114.

Figure 2:
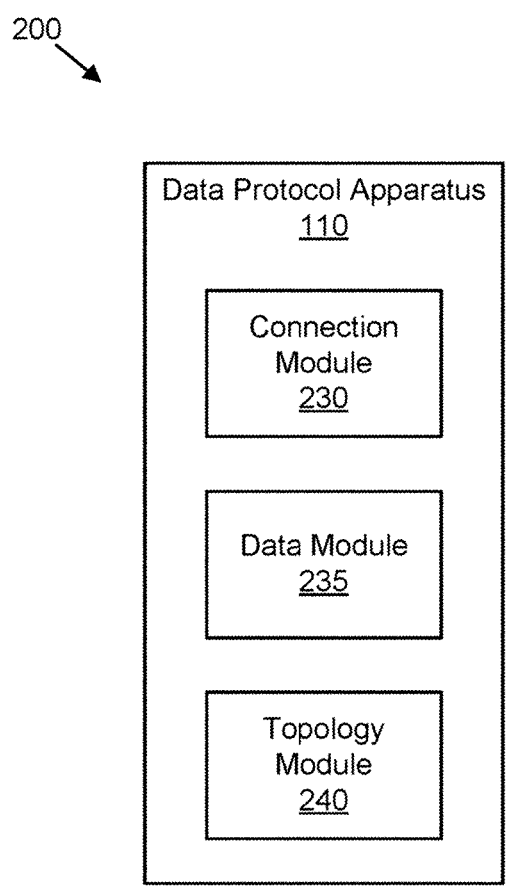
FIG. 2 is a schematic block diagram illustrating one embodiment of an apparatus for managing peripheral devices using a data protocol.

FIG. 2 depicts one embodiment of an apparatus 200 for managing peripheral devices using a data protocol. The apparatus 200 includes an embodiment of a data protocol apparatus 110. The data protocol apparatus 110 includes a connection module 230, a data module 235, and a topology module 240, which are described in more detail below.

The connection module 230 determines one or more communication bus cables 123 that communicatively couple one or more peripheral devices 114 to an information handling device 102. In one embodiment, the connection module 230 may send a command over each communication bus cable 123 to determine which communication bus cables 123 are coupled to a peripheral device 114. In another embodiment, the BIOS 106 may perform a system check at system startup to determine which peripheral devices 114 are present and coupled to the information handling device 102 using a communication bus cable 123. The connection module 230 may build, generate, manage, maintain, and/or the like a table of peripheral devices 114 that are coupled to the information handling device 102 and the associated communication bus cables 123 that are coupled to the determined peripheral devices 114.

The data module 235 reads a data packet associated with a peripheral device 114 over each of the one or more communication bus cables 123. The data packet may contain one or more data fields that include data, information, or the like for a peripheral device 114, for a backplane 122, for a SEP 115 of a backplane 122, and/or the like. Table 1 below illustrates one example of a data packet for a protocol for managing peripheral devices 114.

TABLE 1

| NVMe Register Set | Offset | Bit | Definition | Details | I2C Master (R/W) |
| --- | --- | --- | --- | --- | --- |
| NVMe Device ID | 0 | 7 | I2C Slave Device Not Ready | Set to '1' when I2C Slave Device is configuring and is not fully functional, else '0'. Master will poll on this | Read Only |

TABLE 1-continued

| NVMe Register Set | Offset | Bit | Definition | Details | I2C Master (R/W) |
|---|---|---|---|---|---|
| | | 6<br>5<br>4<br>3<br>2<br>1<br>0 | Hard Coded to 4 Eh | register until '0'. Offset 1-9 is invalid when set to '1'. ASCII 'N' for NVMe. Note: This register is valid even when "NVMe Device ID" bit 7 is a '1'. | |
| Version Register | 1 | 7<br>6<br>5<br>4<br>3<br>2<br>1<br>0 | I2C Slave Device Version in BCD | Version should be presented in binary coded decimal. For example I2C Slave Device version ten is written as 10 h. | Read Only |
| Capability Register 2 | 2 | 7<br>6<br>5<br>4 | Reserved | Reserved as Fh | Read Only |
| | | 3<br>2 | I2C Master Read Timeout | Defines the amount of time the NVMe I2C master must wait before reading the register set again. Encoded as 0 h = 0 s, 1 h = 50 ms, 2 h = 100 ms. Others reserved. | |
| | | 1 | Data Parity Support | Set to '1' if the I2C Slave Device supports data parity on register "Control/Status Register 0" and "Payload Checksum" is valid. | |
| | | 0 | I2C Slave Device bus speed capability | Set to '1' if I2C Slave Device Supports 400 kHz (preferred) else '0' for 100 kHz. A value of '1' does not imply the master must run at 400 kHz. | |
| Capability Register 1 | 3 | 7<br>6<br>5<br>4<br>3 | Reserved | Reserved as 1 Fh | Read Only |
| | | 2<br>1<br>0 | Backplane Type | Denotes type of backplane: 0 h = NVMe only, 1 h = NVMe + SAS, 2 h = SAS only, others reserved | |
| Capability Register 0 | 4 | 7<br>6<br>5<br>4<br>3<br>2<br>1<br>0 | Total NVMe device support | Number of NVMe devices supported by I2C Slave Device. Encoded as 1 h = 1 total drive, FFh = 225 total drives. This is calculated based on number of I2C masters that the I2C slave device sees. | Read Only |
| Control/Status Register 3 | 5 | 7<br>6<br>5<br>4<br>3<br>2<br>1<br>0 | Slot ID | NVMe device's Slot ID. Since NVMe is actually a PCIe slot, this defines the Slot ID the operating system will use. | Read Only |
| Control/Status Register 2 | 6 | 7<br>6<br>5<br>4<br>3<br>2<br>1<br>0 | Bay ID | NVMe device's Bay ID. Note that 'Bay ID' is the physical location of the slot in the front of the system and will by the same as the SAS 'Bay ID'. | Read Only |
| Control/Status Register 1 | 7 | 7<br>6<br>5<br>4 | Reserved | Reserved as Fh | Read Only |

TABLE 1-continued

| NVMe Register Set | Offset | Bit | Definition | Details | I2C Master (R/W) |
|---|---|---|---|---|---|
| | | 3 | IFDET_# | Slate of IFDET signal. For NVMe this is a '0'. | |
| | | 2 | HP_PRESENT# | State of drive presence signal. For NVMe this is a '1'. | |
| | | 1 | Auto Configuration Status | Set to '1' when BMC has set the Port ID values, else '0'. | |
| | | 0 | HP_PWR_LED# | NVME Power LED (e.g., Green) active low. A read reflects the state of the pin on the I2C Slave Device. Default '1'. | |
| Control/Status Register 0 | 8 | 7 | Data Parity | If parity is unsupported (see "Capability Register 2" bit 1) this bit is reserved as '1'. For I2C master reads, this bit reflects the SUM of bits 6 to 0 of "Control Status Register 0". For I2C master writes, the parity bit set by the master covers bits 6 to 0. If parity does not match, the data is thrown out. | Read/Write |
| | | 6 5 | Reserved | Reserved as 3 h | Read Only |
| | | 4 | Device Scratchpad | I2C master scratch pad. Default '0'. | Read/Write |
| | | 3 | HP_PERST# | NVMe device reset active low. A read reflects the value of the last I2C master write to this location. Default '1'. | |
| | | 2 1 | HP_ATN_LED Blink Rate Register | Encoded: 0 h = 0 Hz (on solid), 1 h = 1 Hz, 2 h = 2 Hz, 3 h = 4 Hz. I2C master must assert HP_ATN_LED# for LED to enable. Defaults to '0'. | |
| | | 0 | HP_ATN_LED# | NVMe attention LED (e.g., amber) active low. A read reflects the value of the last I2C master write to this location. Default '1'. | |
| Payload Checksum | 9 | 7 6 5 4 3 2 1 0 | Checksum of byte 0 to byte 7 (e.g.., this does not include byte 8) | Byte 0 + Byte 1 + . . . + Byte 6 + Byte 7 | Read Only |

As illustrated in Table 1, each data packet includes one or more data fields that include information defining an identifier for a location where the peripheral device 114 is installed. For example, the data packet may include a data field for data indicating a bay ID that identifies a drive bay 121 where a peripheral device 114 is installed, and a data field for data indicating a slot 117 connected to the communication bus cable 123 communicatively coupled to the peripheral device 114.

In a further embodiment, the data packet further includes one or more fields that include data describing one or more characteristics of a SEP 115 of a backplane 122. In some embodiments, the data packet includes a flag that indicates whether the SEP 115 supports data parity. For example, the FPGA 204 may write data to one or more writeable fields of the data packet, including a parity data field that includes parity data for the SEP 115 to use to verify the integrity of the written data, if the SEP 115 supports data parity as indicated by the parity flag in the data packet. In such an example, the FPGA 204 may first request a data packet from the SEP 115 for a particular peripheral device 114, read the parity data field, and include a parity bit along with the data written to the other writeable data fields of the data packet before the data packet is sent to the SEP 115.

In another example, the data packet may include a data field that includes data indicating a maximum, minimum, average, median, or the like clock speed of the SEP 115. In a further example, the data packet may include a data field that includes data indicating a time-out parameter defines a period of time before the data module 235 polls the SEP 115 again for a data packet in response to not receiving a response from the SEP 115. In another example, the data packet may include a data field indicating a maximum number of peripheral devices 114 that are supported by the SEP 115, the backplane 122 where the SEP 115 is located, and/or the like. Other data included in the data packet may include an identifier for the peripheral device 114, the backplane 122, the SEP 115, and/or the like, version information for the peripheral device 114, the backplane 122, the SEP 115, and/or the like, state information for the peripheral device (e.g., active, enabled, disabled, or the like), a checksum for one or more data fields that can be used to verify the integrity of one or more data fields, and/or the like. In certain embodiments, described in more detail below, the FPGA 204 adjusts one or more performance characteristics based on the characteristics of the SEP 115, the peripheral devices 114, the backplane 122, and/or the like as determined from the data included in the received data packet.

The topology module 240 determines a cable connection configuration for the one or more communication bus cables 123 and the one or more peripheral devices 114 based on the installation location identifier received from each of the data packets associated with the one or more peripheral devices 114. The topology module 240, for example, may create a table of mappings of communication bus cables 123 to the corresponding installation location identifiers, e.g., the slot IDs and the bay IDs of the peripheral devices 114 that each of the communication bus cables 123 are communicatively coupled to.

In one embodiment, the table of mappings is embodied as an advanced configuration and power interface ("ACPI") table. As used herein, ACPI is a type of interface that enables an operating system to directly configure and manage hardware components. In such an embodiment, the topology module 240 provides the mappings table that describes the cable connection configuration of the communication bus cables 123 and the peripheral devices 114 to the BIOS 106, the operating system for the information handling device 102, and/or the like. In a further embodiment, the BIOS 106 and/or operating system may use the ACPI table to program, assign, or otherwise associate a PCIe port on the information handling device 102 (e.g., on the motherboard) and/or on the backplane 122 with the identifier, e.g., the slot ID for a slot 117, received in the data packet.

In this manner, the data protocol apparatus 110 provides a data packet or protocol for sending and receiving data describing various states, characteristics, statuses, and/or the like for peripheral devices 114, SEPs 115, backplanes 122, and/or the like, in an system 100/150/175 that uses communication bus cables 123 to connect various peripheral devices 114 to an information handling device 102, as opposed to direct, physical connections, e.g., communication bus lines in a printed circuit board between a processor 104 and a PCIe slot where a peripheral device 114 is inserted. Accordingly, the processor 104, the FPGA 204, the BMC 113, the operating system, and/or other components of the information handling device 102 can dynamically adjust to the characteristics of the peripheral devices 114, the backplane 122, the SEP 115, and/or the like. Furthermore, the data protocol apparatus 110 may provide information, notifications, warnings, messages, or the like to the BIOS 106, the operating system, an end-user, and/or the like to indicate a state of the system 100/150/175, such as whether there is an issue, error, problem, or the like with the communication bus cable configuration between the information handling device 102 and one or more peripheral devices 114 of the backplanes 122.

Figure 3:
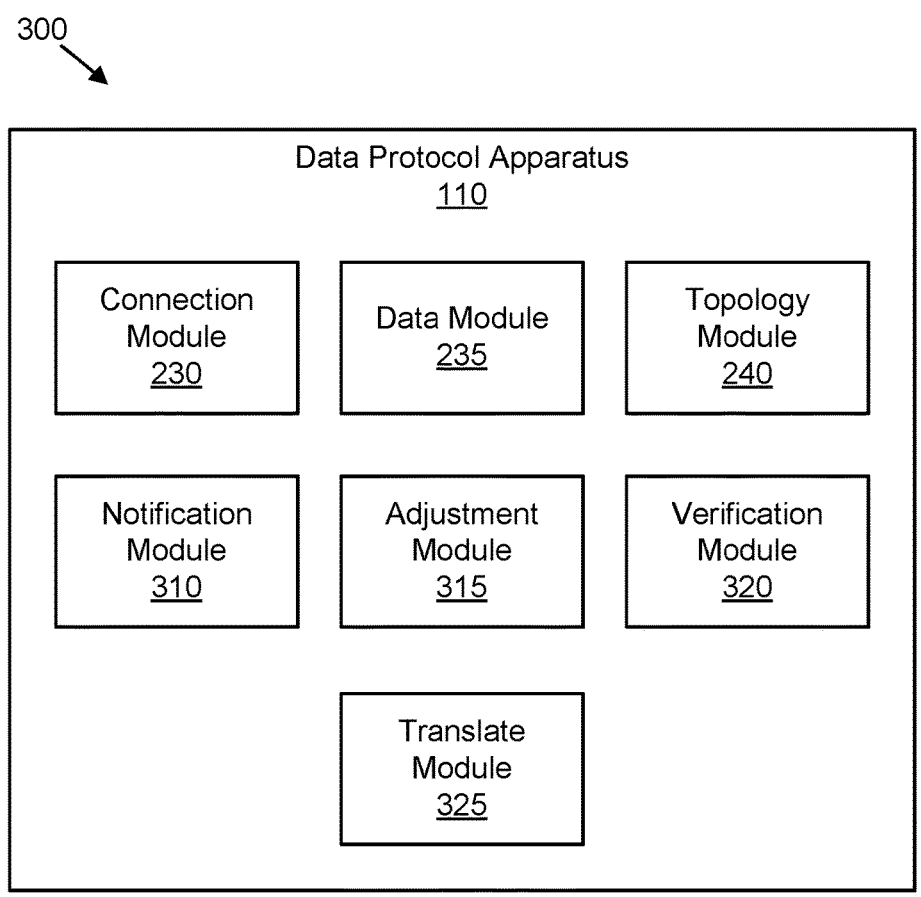
FIG. 3 is a schematic block diagram illustrating one embodiment of another apparatus for managing peripheral devices using a data protocol.

FIG. 3 depicts one embodiment of an apparatus 300 for managing peripheral devices using a data protocol. The apparatus 300 includes an embodiment of a data protocol apparatus 110. The data protocol apparatus 110 includes a connection module 230, a data module 235, and a topology module 240, which are substantially similar to the connection module 230, the data module 235, and the topology module 240 described above with reference to FIG. 2. In one embodiment, the data protocol apparatus 110 includes one or more of a notification module 310, an adjustment module 315, a verification module 320, and a translate module 325, which are described in more detail below.

The notification module 310, in one embodiment, sends a notification in response to the determined cable connection configuration not matching a predefined cable connection configuration. In certain embodiments, a particular system 100/150/175 may have a recommended cable connection configuration between the information handling device 102 and one or more peripheral devices 114 of the backplanes 122, which defines a required or recommended cable connection topology, e.g., which communication bus cables 123 should be connected to which install locations, e.g., which slots 117 and bays 121, for peripheral devices 114 on a backplane 122.

The notification module 310, based on a determination that the determined communication bus cable configuration does not match the predefined communication bus cable configuration, sends a notification to warn or inform the BIOS 106, the operating system, the FPGA 204, an end-user, and/or the like that determine communication bus cable configuration is incorrect or is otherwise not configured in a recommended manner.

In one embodiment, the topology module 240 determines whether the determined communication bus cable configuration matches the predefined communication bus cable configuration by comparing data in the mappings table of install location identifiers to the communication bus cables that are connected to the identifier install location with a predefined mappings table of substantially similar install location identifier to communication bus cable mappings. In certain embodiments, the notification module 310 sends various notifications that include information regarding the states of the peripheral devices 114, the number of peripheral devices 114 that are present and/or active/disabled, and/or the like based on information received in the data packet.

The adjustment module 315, in one embodiment, dynamically modifies one or more performance characteristics of the FPGA 204 based on to the one or more characteristics of the SEP 115. For example, the adjustment module 315 may change how often the FPGA polls the SEP 115 for a data packet for a peripheral device 114 based on the data in the timeout data field of the data packet. In another example, the adjustment module 315 may adjust the rate in which commands are sent to the SEP 115 from the FPGA 204, or the processor 104 via the FPGA 204 based on the clock speed of the SEP 115, whether the SEP 115 is currently busy or not, the capabilities of the backplane 122 (e.g., the type of backplane 122 the communication bus speeds on the backplane 122, or the like), and/or the like.

In one embodiment, the verification module 320 checks or verifies an integrity of data included in one or more fields of the data packet using a checksum. The checksum, in some embodiments, is included in a checksum field of the data packet. For example, the SEP 115 may populate each data field of the data packet with data, generate a checksum using the data that is in the data packet, and store the checksum in the checksum field of the data packet. Accordingly, when the data module 235 receives the data packet over a communication bus cable 123, the verification module 320 uses the checksum to verify that the data (e.g., the bay ID and slot ID, the capability data of the SEP 115 and/or backplane 122, and/or the like that is stored in the data packet) has not been tampered with, does not include any errors, and/or the like.

In one embodiment, the translate module 325 receives a virtual pin port ("VPP") command from a VPP enabled processor 104, or a processor 104 configured to send and receive commands over a VPP sideband connection. As used herein, a VPP may include a serial bus-based interconnect for peripheral devices 114, such as PCIe NVMe devices, that are hot-pluggable. The VPPs may be part of an input/output hub of the processor 104, e.g., a VPP-enabled chipset by Intel®, and may be configured to serially shift the sideband PCIe hot-plug signals in and out.

The VPP architecture is designed for interfacing with peripheral devices 114 located in mechanically fixed slots, such as physical PCIe slots on a motherboard, and may not extend to interfacing with peripheral devices 114 that are connected to the processor 104 using communication bus cables 123. For example, the VPP architecture may provide support enabling a peripheral device 114, for determining whether a drive is present at a particular physical slot, and/or controlling the activity indicator LED on the peripheral device 114. However, in systems 100/150/175 that utilize communication bus cables 123 to couple a processor 104 to one or more peripheral devices 114, the VPP architecture does not have the capabilities to completely manage peripheral devices 114 installed on a backplane 122 and connected to a processor 104 using one or more communication bus cables 123.

For example, if communication bus cables 123 are swapped and connected to the incorrect installation location of a peripheral device 114, e.g., the incorrect slot 117 and/or bay 121, the VPP architecture would be unaware of the erroneous communication bus cable 123 configuration, which may cause the operating system and/or BIOS 106 to be out of sync with the current hardware topology. Furthermore, because of electrical routing constraints, e.g., on the motherboard, the VPP architecture may not allow direct connections to multiple backplanes 122. In addition, the VPP architecture may not provide any data integrity checking, such as checksums and data parity values.

Thus, the protocol described herein provides an extended and more descriptive architecture that provides capabilities for managing multiple peripheral devices 114 located on multiple backplanes 122 and connected to the processor 104 using one or more communication bus cables 123. In one embodiment, the translate module 325 receives a VPP command from the processor 104 and translates, converts, encodes, or the like the received VPP command to a corresponding data field in the data packet.

The VPP command, in some embodiments, may be intended for a peripheral device 114 on a backplane 122 that is identified by the install location identifier that the data module 235 receives. In a further embodiment, the translate module 325 writes the VPP command to a corresponding data field in the data packet. The VPP command, in some embodiments, includes an enable command for a peripheral device 114, a disable command for a peripheral device 114, and/or a command to toggle an activity indicator on the peripheral device 114, such as an LED. Thus, the translate module 325 may receive a VPP command to toggle the activity indicator LED on a particular peripheral device 114, determine which data packet of the data field corresponds to the received VPP command, and write a value that corresponds to the value of the VPP command to the corresponding data field in the data packet.

In various embodiments, the translate module 325 sends the data packet that includes the VPP command to the SEP 115 on the backplane 122 using a communication bus cable 123 coupled to the SEP 115 and associated with the intended peripheral device 114. For example, the translate module 325 may receive a VPP command to disable a peripheral device 114. The translate module 325 may determine a slot ID and bay ID for the intended peripheral device 114, and the communication bus cable 123 that is coupled to the determined slot ID and bay ID, e.g., using the mappings table provided by the topology module 240. The translate module 325 may then encode the VPP command to a corresponding value in the data field of the data packet that corresponds to the disable command, and send the data packet to the SEP 115 over the identified communication bus cable 123.

In one embodiment, the translate module 325 writes a parity value to a parity field of the data packet before sending the data packet to the intended peripheral device 114. The parity value may be used by the SEP 115 to verify the integrity of the data written to the data packet, such as the integrity of the VPP command encoded in the data packet. The parity value, as described above in Table 1, may be generated using a combination of one or more bits of various data fields. The translate module 325, in one embodiment, generates and writes a parity value to the parity field if the SEP 115 supports data parity, as indicated in different data field of the data packet.

Figure 4:
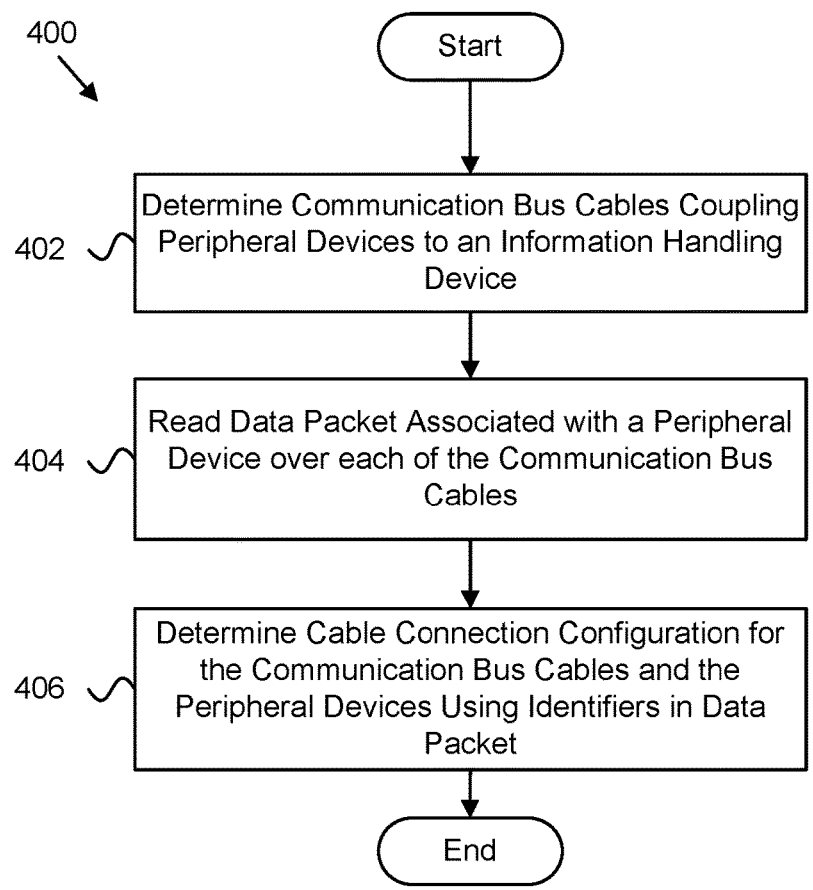
FIG. 4 is a schematic flow chart diagram illustrating one embodiment of a method for managing peripheral devices using a data protocol.

FIG. 4 depicts one embodiment of a method 400 for managing peripheral devices using a data protocol. The method 400 begins, and determines 402 one or more communication bus cables 123 that communicatively couple one or more peripheral devices 114 to an information handling device 102. The method 400 reads 404 a data packet associated with a peripheral device 114 over each of the one or more communication bus cables 123. Each data packet includes an identifier for a location where the peripheral device 114 is installed. The method 400 determines 406 a cable connection configuration for the one or more communication bus cables 123 and the one or more peripheral devices 114 based on the installation location identifier received from each of the data packets associated with the one or more peripheral devices 114, and the method 400 ends. In some embodiments, the connection module 230, the data module 235, and/or the topology module 240 perform the various steps of the method 400.

Figure 5:
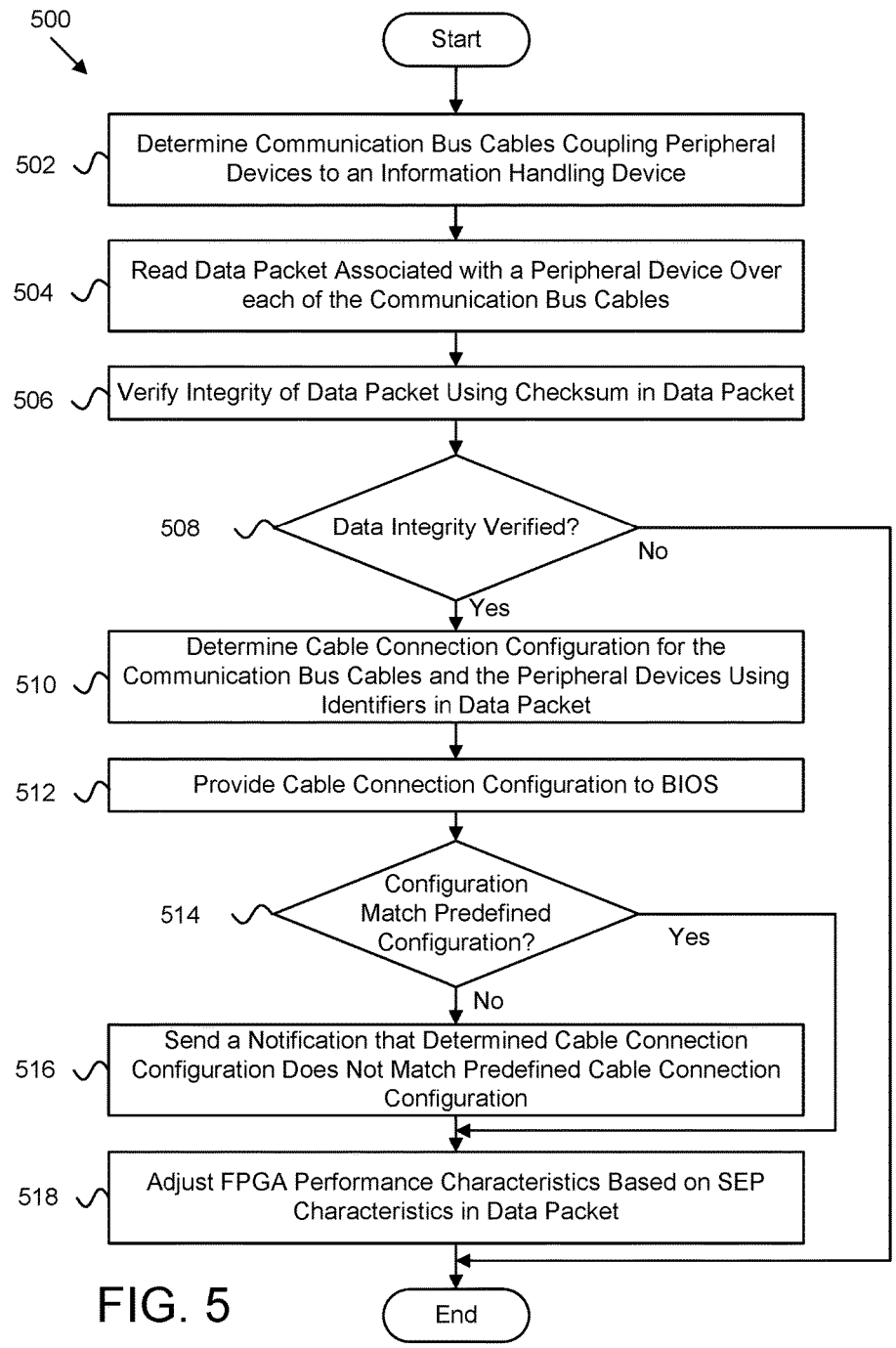
FIG. 5 is a schematic flow chart diagram illustrating one embodiment of another method for managing peripheral devices using a data protocol.

FIG. 5 depicts one embodiment of a method 500 for managing peripheral devices using a data protocol. The method 500 begins, and determines 502 one or more communication bus cables 123 that communicatively couple one or more peripheral devices 114 to an information handling device 102. The method 500 reads 504 a data packet associated with a peripheral device 114 over each of the one or more communication bus cables 123. In one embodiment, the method 500 verifies 506 an integrity of data included in one or more fields of the data packet using a checksum that is included in a checksum field of the data packet.

If the method 500, in some embodiments, determines 508 that the integrity of the data packet is not valid, based on the checksum, which may indicate that there is an error in the data, that the data has been tampered with, or the like, the method 500 ends. Otherwise, if the method 500, in certain embodiments, determines 508 that the integrity of the data is valid, the method 500 determines 510 a cable connection configuration for the one or more communication bus cables 123 and the one or more peripheral devices 114 based on the installation location identifier received from each of the data packets associated with the one or more peripheral devices 114.

In some embodiments, the method 500 provides 512 the cable connection configuration of the communication bus cables 123 and the peripheral devices 114 to the BIOS or operating system of the information handling device 102. The method 500, in one embodiment, determines 514 whether the determined cable connection configuration matches a predefined cable connection configuration. If not, the method 500 sends 516 a notification, in one embodiment, to indicate that the determined connection configuration of the communication bus cables 123 does not match the predefined or recommended cable connection configuration.

In a further embodiment, the method 500 dynamically adjusts 518 one or more performance characteristics of the FPGA 204 based on one or more characteristics of the SEP 115 included in the data packet that the method 500 received. As described above, in one embodiment, the FPGA 204 is communicatively coupled to the SEP 115 and one or more peripheral devices 114 of the backplane 122 using communication bus cables 123 in a master/slave configuration where the FPGA 204 is the bus master and directs or manages communications with the SEP 115 as bus slave and the peripheral devices 114 as slave devices, and the method 500 ends. In some embodiments, the connection module 230, the data module 235, the topology module 240, the notification module 310, the adjustment module 315, the verification module 320, and/or the translate module 325 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a connection module that determines one or more communication bus cables that communicatively couple one or more peripheral devices of a backplane to an information handling device;
a data module that receives a data packet associated with each peripheral device from a field programmable gate array ("FPGA") that is communicatively coupled to each peripheral device over each of the one or more communication bus cables and a storage enclosure processor ("SEP") of the backplane that manages the one or more peripheral devices of the backplane, each data packet comprising an identifier for a drive bay of the backplane where the peripheral device is installed, the identifier comprising a bay identifier and a corresponding slot identifier for the drive bay, and data describing one or more characteristics of the SEP;
a topology module that determines a cable connection configuration for the one or more communication bus cables and the one or more peripheral devices based on the identifier for the drive bay of the backplane received from each of the data packets associated with the one or more peripheral devices;
a notification module that sends a notification in response to the determined cable connection configuration not matching a predefined cable connection configuration for the backplane; and
an adjustment module that dynamically modifies one or more performance characteristics of the FPGA based on the one or more characteristics of the SEP,
wherein said modules comprise one or more of hardware circuits, programmable hardware devices, and a processor executing code.

2. The apparatus of claim 1, wherein the topology module provides the cable connection configuration of the communication bus cables and the peripheral devices to a basic input/output system ("BIOS").

3. The apparatus of claim 1, wherein the data packet comprises a plurality of fields defining the identifier, the plurality of fields comprising a field for the bay identifier and a field for the slot identifier.

4. The apparatus of claim 1, wherein the one or more characteristics for the SEP comprises:
a flag indicating whether the SEP supports data parity;
a maximum clock speed for the SEP;
a time-out parameter for polling the SEP; and
a maximum number of peripheral devices supported by the SEP.

5. The apparatus of claim 1, further comprising a verification module that checks an integrity of data included in one or more fields of the data packet using a checksum, the checksum included in a checksum field of the data packet.

6. The apparatus of claim 1, further comprising a translate module that:
receives a virtual pin port ("VPP") command from a VPP enabled processor, the VPP command intended for a peripheral device on a backplane, the peripheral device identified by the installation location identifier;
writes the VPP command to a corresponding field in the data packet; and
sends the data packet comprising the VPP command to a storage enclosure processor ("SEP") on the backplane using a communication bus cable coupled to the SEP and associated with the intended peripheral device.

7. The apparatus of claim 6, wherein the translate module writes a parity value to a parity field of the data packet, the parity value used by the SEP to verify an integrity of data written to the data packet.

8. The apparatus of claim 6, wherein the VPP command comprises one or more of:
a peripheral device enable command;
a peripheral device disable command; and
a peripheral device activity indicator toggle command.

9. The apparatus of claim 1, wherein the communication bus cable comprises a peripheral component interconnect express ("PCIe") cable.

10. The apparatus of claim 1, wherein the peripheral device comprises a non-volatile memory express ("NVMe") storage device.

11. A method comprising:
determining one or more communication bus cables that communicatively couple one or more peripheral devices of a backplane to an information handling device;
receiving a data packet associated with each peripheral device from a field programmable gate array ("FPGA") that is communicatively coupled to each peripheral device over each of the one or more communication bus cables and a storage enclosure processor ("SEP") of the backplane that manages the one or more peripheral devices of the backplane, each data packet comprising an identifier for a drive bay of the backplane where the peripheral device is installed, the identifier comprising a bay identifier and a corresponding slot identifier for the drive bay, and data describing one or more characteristics of the SEP;
determining a cable connection configuration for the one or more communication bus cables and the one or more peripheral devices based on the identifier for the drive bay of the backplane received from each of the data packets associated with the one or more peripheral devices;

sending a notification in response to the determined cable connection configuration not matching a predefined cable connection configuration for the backplane; and dynamically modifying one or more performance characteristics of the FPGA based on the one or more characteristics of the SEP.

12. The method of claim 11, further comprising providing the cable connection configuration of the communication bus cables and the peripheral devices to a basic input/output system ("BIOS").

13. The method of claim 11, wherein the data packet comprises a plurality of fields defining the identifier, the plurality of fields comprising a field for the bay identifier and a field for the slot identifier.

14. The method of claim 11, further comprising:

receiving a virtual pin port ("VPP") command from a VPP enabled processor, the VPP command intended for a peripheral device on a backplane, the peripheral device identified by the installation location identifier;

writing the VPP command to a corresponding field in the data packet; and sending the data packet comprising the VPP command to a storage enclosure processor ("SEP") on the backplane using a communication bus cable coupled to the SEP and associated with the intended peripheral device.

15. A program product comprising a non-transitory computer readable storage medium that stores code executable by a processor, the executable code comprising code to perform:

determining one or more communication bus cables that communicatively couple one or more peripheral devices of a backplane to an information handling device;

receiving a data packet associated with each peripheral device from a field programmable gate array ("FPGA") that is communicatively coupled to each peripheral device over each of the one or more communication bus cables and a storage enclosure processor ("SEP") of the backplane that manages the one or more peripheral devices of the backplane, each data packet comprising an identifier for a drive bay of the backplane where the peripheral device is installed, the identifier comprising a bay identifier and a corresponding slot identifier for the drive bay, and data describing one or more characteristics of the SEP;

determining a cable connection configuration for the one or more communication bus cables and the one or more peripheral devices based on the identifier for the drive bay of the backplane received from each of the data packets associated with the one or more peripheral devices;

sending a notification in response to the determined cable connection configuration not matching a predefined cable connection configuration for the backplane; and dynamically modifying one or more performance characteristics of the FPGA based on the one or more characteristics of the SEP.

* * * * *